June 14, 1966  D. M. GATCH  3,255,987
ADJUSTABLE PLASTIC PIN SUPPORT
Filed April 28, 1965  2 Sheets-Sheet 1
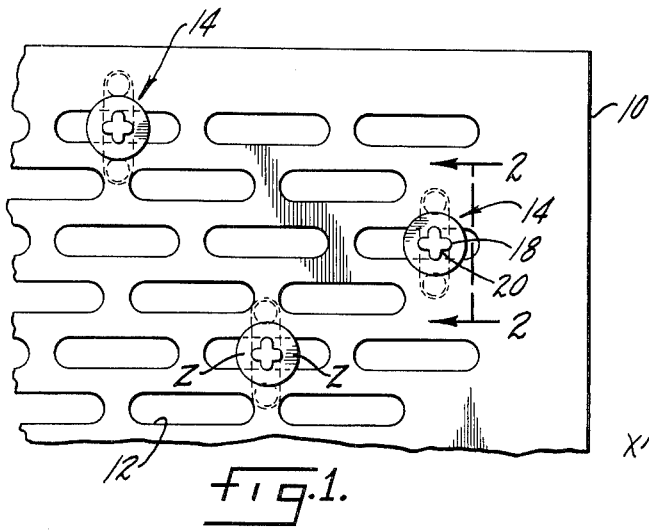
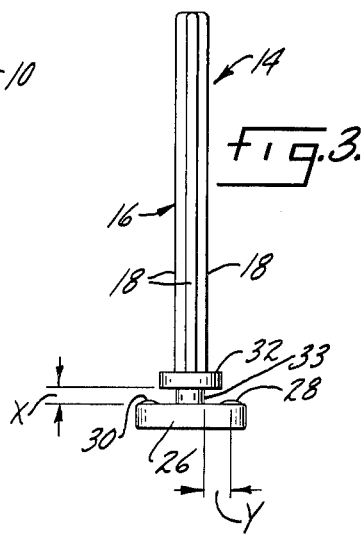
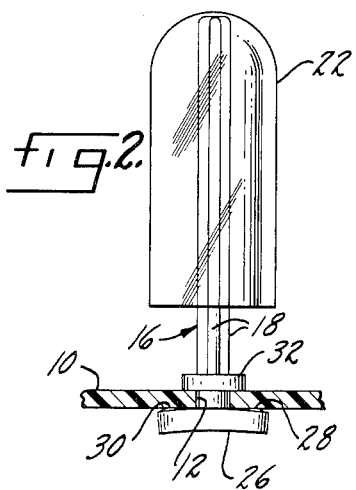
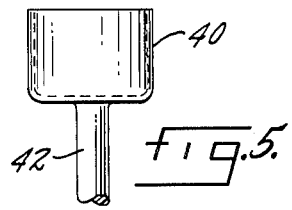
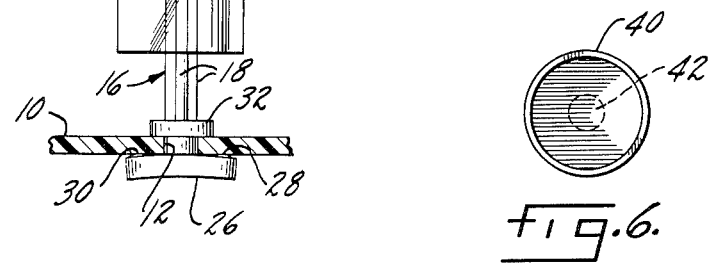
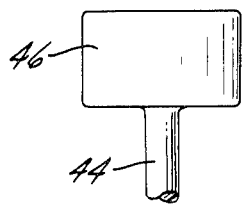
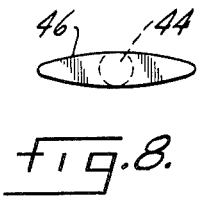
INVENTOR.
David M. Gatch,
BY Parker & Carter
Attorneys.

June 14, 1966 D. M. GATCH 3,255,987
ADJUSTABLE PLASTIC PIN SUPPORT
Filed April 28, 1965 2 Sheets-Sheet 2
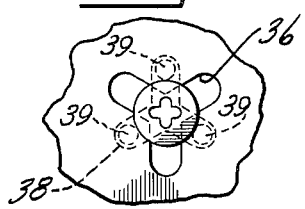
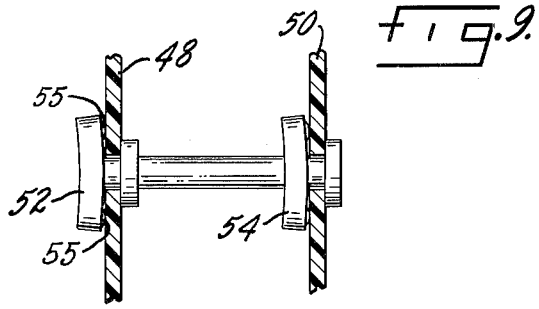
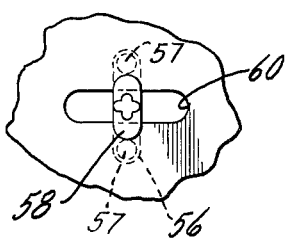
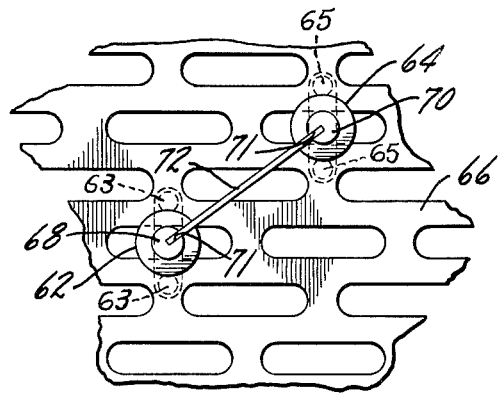
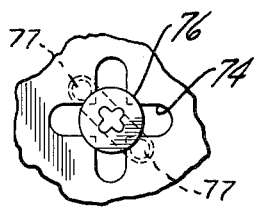
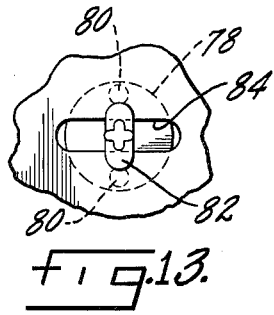
INVENTOR.
David M. Gatch,
BY Parker & Carter
Attorneys.

United States Patent Office 3,255,987
Patented June 14, 1966

3,255,987
ADJUSTABLE PLASTIC PIN SUPPORT
David M. Gatch, Huntington Park, Calif., assignor to G. B. Lewis Company, Watertown, Wis., a corporation of Wisconsin
Filed Apr. 28, 1965, Ser. No. 451,473
8 Claims. (Cl. 248—223)

This is a continuation-in-part of Serial No. 366,944, filed May 13, 1964, now abandoned.

This invention is in the field of connections and is concerned with a releasable connection which can be made and then released or left indefinitely.

A primary object of the invention is a connection with a maximum amount of adjustment and flexibility.

Another object is a connection between a panel or sheet and a joint which provides a rigid but resilient compression fit.

Another object is a connection of the above type which may be used in a pin support for industrial applications or as an apertured board for household and related uses.

Another object is a connection between a panel or sheet and a rod or shank.

Another object is a method of connecting a plurality of general parallel sheets or panels in spaced relation.

Another object is a connection of the above type which can be used in box construction or containers of various types.

Another object is an adjustable pin support assembly in which pins can be simply, efficiently and removably mounted in a selective pattern.

Another object is an adjustable pin support wherein unitary pins may be quickly and simply locked to a board or the like by simply turning the pins to create a frictional contact.

Another object is a pin support where pins can be removably mounted in different patterns on a board or the like so that such pins can act as supports, containers, dividers or the like for various articles carried by the board or supported in a container.

Another object is an economically produced adjustable plastic pin support in which resilient features of plastics or metal or a combination are utilized to effect a quick and secure lock for the pins when mounted on boards or the like.

Another object is an adjustable pin support wherein pins may be releasably mounted on a board or the like to serve as supports for fragile articles such as glass envelopes.

Another object is a plastic adjustable pin support wherein pins may be quickly and simply locked and released at different points on a board or the like, and wherein the shanks of the pins may be modified to form containers, wall partitions or the like.

Another object is a plastic pin support in which plastic pins are releasably locked to a board and the locking feature utilizes the slight resiliency of the plastic which yields with making a frictional contact for the lock.

The foregoing objects are obtained along with other objects which will become apparent upon considering the following disclosure formed in part by the attached drawings wherein:

FIGURE 1 is a top plan view of pins mounted on a board;

FIGURE 2 is a sectional view along line 2—2 of FIGURE 1;

FIGURE 3 is a side elevational view of one form of the pin;

FIGURE 4 is a plan view of a variant form of connection;

FIGURE 5 is a partial side elevational view of a modified form;

FIGURE 6 is a top plan view of the form shown in FIGURE 5;

FIGURE 7 is a partial side elevational view of another modified form;

FIGURE 8 is a top plan view of the form shown in FIGURE 7;

FIGURE 9 is a sectional view of a variant form;

FIGURE 10 is a top plan view of a further variant;

FIGURE 11 is a top plan view of another form;

FIGURE 12 is a top plan view of another form; and

FIGURE 13 is a top plan view of another form.

The adjustable pin support assembly shown in FIGURES 1 and 2 includes a base, panel, support or the like 10 having a plurality of openings shown as elongated slots 12 arranged in any suitable pattern. Pins indicated generally at 14 are shown mounted in locked relationship in some of the slots. The board or panel preferably has a uniform thickness as indicated in FIGURE 2 so that any one of a standard set of pins 14, such as shown in FIGURES 2 and 3, may be locked in any of the elongated slots.

The pin illustrated in FIGURES 2 and 3 has a shaft portion 16 which may be modified in a variety of ways. A modification shown here resembles a clover leaf in cross section and includes lobes, such as at 18, flanking grooves at 20 therebetween. An article, such as a fragile glass envelope 22, may be placed over the shaft, or a sheet, which is not shown, may be positioned between a pair of aligned pins so that opposed edges of the sheet rest in properly aligned grooves of the shaft.

The pin has a connection which includes a crosspiece or enlargement 26 which is dimensioned so that it may enter and pass through the long dimension of an elongated slot 12. The crosspiece is shown with a pair of buttons or projections 28, 30 which coact with a fixed flange or second enlargement 32 to lock the pin on the panel. The illustrated flange has the shape of a disc, and the distance between the bottom of the flange and the top of the crosspiece, indicated at X, is slightly greater than the thickness of the board 10. The distance between the top of the projections 28 and the bottom of the flange 32 is slightly less than the thickness of the panel. The crosspiece 26 may be passed through an elongated slot 12 until the bottom of flange 32 contacts or abuts the top of the panel, and then the crosspiece may be manually turned at an angle to the long dimension of the elongated slot until projections 28, 30 frictionally contact the bottom of the panel. The pin is preferably made of plastic or other substantially rigid material which has a slight resilience so that there is a slight yield when the projections frictionally contact the bottom of the panel. This enhances the security of the lock as well as allowing the locking action to be simply made.

The projections 28 and 32 are spaced sufficiently out on the enlargement 26, for example the distance Y in FIGURE 3, relative to the thickness and dimensions of the enlargement and its flexibility and material characteristics such that the enlargement will arc or flex somewhat. Note the disposition of the bottom enlargement 26 in FIGURE 2. The opposite ends of the enlargement have been bent back slightly or flexed thereby providing a tight fit with and across the panel. Also, with the enlargement 26 flexed as shown in FIGURE 2, the disk shaped other enlargement 32 will be drawn fully flush against the opposite surface of the panel thereby providing a flush fit. The overhanging sides of an enlargement 32, as at Z in FIGURE 1, provide stability and prevent the connection from rocking, although in certain applications this may not be necessary.

In effect, the connection is made up of two enlargements, at least one of which will pass through the opening of the panel. Thereafter, the connection is turned, possibly 90°, until the interference fit provides a tight compression, causing at least one of the enlargements to flex. Since the enlargements are interconnected by a rigid, integral shank, the enlargements are on opposite sides of the panel but tied together and a tight compression fit results.

In FIGURE 4 I have shown a variant form in which the opening in the panel has three legs or lobes, as at 36, as does the lower enlargement 38. In this case, the enlargement 38 is aligned with the openings 36 and is passed through the panel, then rotated something on the order of 60° until the interlock is provided. As before, the same type of releasable compression or interference fit may be provided by projections 39.

The shank portion of the pin may be other than in FIGURE 3 to serve various purposes of the user. In FIGURE 5 a cuplike container 40 may be provided at the top of shank portion 42. The container may be used alone to hold, for example, small electrical components. A plurality of such pins may likewise be mounted in a selective pattern on a work bench where the pin support is conventionally accessible. In FIGURES 7 and 8 the top of the shank 44 has a tapered wall portion 46. A plurality of such pins may be selectively mounted so that adjoining wall portions form a dividing wall, for example.

In FIGURE 9, a variant form has been shown in which the connection is used to space two such panels, for example as at 48 and 50. Two such connections 52 and 54 with projections 55 are spaced a predetermined distance apart so that after they are passed through openings in the panels and turned to provide the interlock, the panels will be spaced a certain distance apart. Such an arrangement might be used to space more than two such panels. Also, in a box type formation, connections might be provided at the corners instead of at random locations through the center of the panels. Since one of the connections must pass completely through at least one of the panels, the connection might be of the type shown in FIGURE 10 in which the larger 56 of the two enlargements may be made as before with projections 57, but the smaller 58 is generally oblong instead of round and conforms more or less to the other enlargement so that it may be passed through the slot type opening 60. While I have shown the connections for the panels 48 and 50 as oriented in the same general direction, it should be understood that they may be symmetrically opposite, in which case the enlargement 58 could be made round, as shown in FIGURES 1 and 2.

In FIGURE 11 I have shown a variant form in which two such connections 62 and 64 with projections 63 and 65 are shown on a panel 66 at a suitable interval. The pins or shafts extending from the connections, as at 68 and 70, have suitable grooves or slots 71 which may be disposed toward each other so that a sheet or wall piece 72 may be suitably positioned between them. Since the connections are flexible and can be slid along the opening, it will be understood that the sheet may be positioned between the two shafts or pins and then the pins pushed toward each other to rigidly hold the panel in place. While I have only shown one sheet between two pins, it may be understood that I may use a group of pins suitably spaced with sheets running between various selected locations. In this manner, I might form a box type structure or any suitable type of enclosure or retainer or container. In that case, the base or panel 66 might only have the exact number of openings desired and located in a predetermined position and after the pins are in place and the wall 72 is in place, the pins might be closed toward each other to tightly hold the walls.

In FIGURE 12, I have shown a variant form in which the opening takes on a four leaf clover effect, as at 74, while the connection is much as before, as at 76 with projections 77. In this arrangement, the enlargement may be turned some 45° to provide the interlock.

In FIGURE 13, I have shown a further variant in which the somewhat longer or larger enlargement 78 has a round exterior with the projections or formations 80 formed thereon to provide the flexure to the enlargement. The second or somewhat smaller enlargement 82 is oblong or elongated in one direction and of such a size and dimension so that it will pass through the opening 84 in the panel. Thus, the connection will be inserted in a direction opposite from that of the one shown in FIGURES 1 and 2 and then the pin or shaft would be rotated to the position shown. The sides of the larger enlargement 78 provide the stability against rocking mentioned hereinabove.

The use and operation of my invention are as follows:

I provide a connection which may be differentially positioned or positioned in one preselected location on a panel or plate. Suitably shaped openings are provided in the plate and the connection has at least one portion which will pass through the opening. Thereafter, the connection is rotated a certain amount, 30°, 45°, 90° etc., and a compression fit is provided due to the interference that exists in the dimensioning. Since one of the enlargements will flex somewhat, the resultant connection is a releasable but nevertheless rigid connection.

The invention may have a variety of uses by an assembly having a base, which may be a plate or board, with a plurality of openings therein. The openings have a greater dimension in one direction than in another direction so that the long dimension of crosspiece 26 of the pin may enter such long dimension. The pins are securely but releasably locked by turning the crosspiece at an angle to the longer dimension of the opening. In this way, the connections frictionally contact the board. The intercepting means may be part of the locking means, and may take different forms such as the flange 32 and projections 28, 30 of FIGURES 1 and 2 which are locked to opposite sides of a board of uniform thickness. The outside surfaces of the stubs will frictionally contact the opposed walls of a shorter dimension of the elongated slots. Other intercepting and locking means may be used to securely but releasably mount a pin in an equivalent manner.

A plurality of such pins may be set at different points on the board to establish a selective pattern for a particular use. For example, a plurality of pins may be spaced at sufficient distances apart to hold fragile glass envelopes in non-contacting relationship on the board. The pins in this case are used merely as a support for holding the articles while transporting them. In this way, the pins may be used to hold the fragile articles for work to be performed on them, such as spraying. The pins may also be used as supporting posts against which may be laid sheets and the like. A pair of such pins may be aligned so that an article may be delicately wedged therebetween and held in position for storage, work and the like. Such an article, for example, may be a radio tube. It is likewise provided that the shank of a pin may be mounted to form containers and wall portions such as shown in FIGURES 5 to 8 and 11. Other modifications in this shape are possible by providing eyelets, hooks or the like to suspend or hold articles such as delicate springs, small rods and the like. The fact is that the adjustable pin support can be applied to multiple uses and modifications.

While the openings have been shown as elongated slots with straight sides, they may likewise be curved slots and the crosspiece may be correspondingly curved to pass through such an opening. The curved or arced crosspiece may still be turned at an angle to the short dimension of such an arced opening to lock the pin. Other shapes are possible so long as the opening has a longer dimension and a shorter dimension to coact with the correspondingly longer dimension of the crosspiece.

While I have shown the shaft or shank of the pin as extended out normal to the connection, it should be understood that it may come out at an angle. Or it might be hook shaped. The point is that the panel might be used as a substitute for a conventional apertured board and the pins could be differentiallly positioned therein to hold tools, pots and pans, or various items. Therefore, the shaping of the shank or pin on either or both sides of the connection is completely arbitrary. For example, instead of a projection pin or hook, it might be a numerical or letter or surface decoration or any suitable pattern.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. In a joint, a panel having at least one opening therein with its periphery defined about its center by varying radii, a connection including two enlargements with a shank between them and spaced from each other a distance no less than the thickness of the panel, at least one enlargement being shaped so that when it is oriented in one direction relative to the opening it will pass through the opening but not when oriented in another direction, and a formation on at least a selected one of the enlargements spaced outwardly a distance from the shank providing an interference fit between the enlargements and the panel when the enlargements are positioned in the opening, on opposite sides of the panel, and oriented in the said another direction, the enlargement with the formation being sufficiently flexible relative to the distance of the formation from the shank such that rotation of the connection from the said one direction to the said another direction causes the selected one of the enlargements to flex thereby providing a rigid compression fit.

2. The structure of claim 1 further characterized in that the opening is in the form of an elongated slot, one of the enlargements being dimensioned so that it will pass through the slot and the other being dimensioned so that it will not pass through the slot.

3. The structure of claim 1 further characterized in that the panel and connection are both made of plastic.

4. The structure of claim 1 further characterized in that the formation on the enlargement includes projections disposed toward the panel.

5. For use in a joint which includes a panel having at least one opening therein with its periphery defined by a varying radius of revolution, the improvement comprising a connection including two enlargements with a shank between them and spaced from each other a distance no less than the thickness of the panel, at least one enlargement being shaped so that when it is oriented in one position it will pass through the opening but not when oriented in another position, and a formation on at least a selected one of the enlargements spaced outwardly a distance from the shank providing an interference fit between the enlargements and the panel when the enlargements are positioned in the opening, on opposite sides of the panel, and oriented in the said another position, the enlargement with the formation being sufficiently flexible relative to the distance of the formation from the shank such that rotation of the connection from the said one position to the said another position causes the selected one of the enlargements to flex thereby providing a rigid compression fit.

6. The structure of claim 5 further characterized in that the opening is in the form of an elongated slot, one of the enlargements being dimensioned so that it will pass through the slot and the other being dimensioned so that it will not pass through the slot.

7. The structure of claim 5 further characterized in that the panel and connection are both made of plastic.

8. The structure of claim 5 further characterized in that the formation on the enlargement includes projections disposed toward the panel.

References Cited by the Examiner

UNITED STATES PATENTS

| | | | |
|---|---|---|---|
| 1,136,625 | 4/1915 | Sonsikowski | 273—130 |
| 1,257,215 | 2/1918 | Greene | 248—38 |
| 1,492,560 | 5/1925 | Fisher | 46—19 |
| 1,867,206 | 7/1932 | Brady | 174—158 |
| 2,048,802 | 7/1936 | Mapson | 312—140 |
| 2,484,263 | 10/1949 | Atkinson | 119—121 |
| 2,520,818 | 8/1950 | Terry | 248—156 X |
| 2,626,062 | 1/1953 | Manzella | 211—59 |
| 2,626,773 | 1/1953 | Backman | 248—239 |
| 2,826,388 | 3/1958 | Janos et al. | 248—239 |
| 2,940,558 | 6/1960 | Schleuter | 189—36 |
| 2,942,364 | 6/1960 | Horton | 40—63 |
| 2,946,457 | 7/1960 | Pierce et al. | 211—86 |
| 3,027,017 | 3/1962 | Luxeder | 211—184 |
| 3,172,538 | 3/1965 | Fowler | 211—49 |
| 3,179,367 | 4/1965 | Rapata | 248—239 |
| 3,180,606 | 4/1965 | Sabin et al. | 248—239 |

FOREIGN PATENTS 519,128   2/1931   Germany.

CLAUDE A. LE ROY, *Primary Examiner.*